Dec. 29, 1931.  F. M. REID  1,838,868
LOCKING DEVICE FOR SEMITRAILERS
Filed July 9, 1926  3 Sheets-Sheet 1

INVENTOR.
Frederick Malcolm Reid.
BY
ATTORNEY.

Dec. 29, 1931.  F. M. REID  1,838,868
LOCKING DEVICE FOR SEMITRAILERS
Filed July 9, 1926  3 Sheets-Sheet 3

INVENTOR.
Frederick Malcolm Reid
BY
Stuart C Barnes
ATTORNEY.

Patented Dec. 29, 1931

1,838,868

UNITED STATES PATENT OFFICE

FREDERICK MALCOLM REID, OF DETROIT, MICHIGAN, ASSIGNOR TO FRUEHAUF
TRAILER COMPANY, OF DETROIT, MICHIGAN, A CORPORATION OF MICHIGAN

LOCKING DEVICE FOR SEMITRAILERS

Application filed July 9, 1926. Serial No. 121,287.

This invention relates to semi-trailers and has to do more particularly with a locking device for locking a semi-trailer to a vehicle for drawing the same.

Semi-trailers are constructed with wheels for supporting the rear end, and the forward end is supported by a vehicle such as a tractor. For this purpose the semi-trailer is usually provided with an upper fifth wheel construction, and the tractor with a lower fifth wheel construction. The tractor is detachable from the semi-trailer and there is usually a support for holding up the front end of the semi-trailer, this support being moved out of the way when the tractor and semi-trailer are connected. Various locking devices have been devised for locking the semi-trailer and tractor together, and it has been proposed to so construct the lock and the support, and connect the two, so that the support is moved to operative or inoperative position upon the engagement or disengagement of the semi-trailer and the truck.

Considerable strain is imposed upon the lock, and it has been found that the locking parts are subject to breakage. This is true particularly with respect to the operation of securing the tractor to the semi-trailer, as the tractor backs into the semi-trailer, and many times there is a severe jamming action. It is desirable that the lock construction be such as to eliminate, as far as possible, breakage thereof and, furthermore, it is desirable to have a lock where a positive operation is assured so that faulty locking, which may result in an accident, is guarded against.

According to the present invention the lock is constructed so as to be operative to engage and disengage the tractor by a reciprocable movement which is caused by the movement of the tractor itself. The device is generally in the form of a clam lock; that is, it has two movable members working in conjunction with each other to grip a co-operating member on the tractor. The action on the two members is positive, thus insuring against faulty locking. The reciprocable movement of the lock is utilized to do work as, for instance, operating the support of the semi-trailer.

Figure 1:
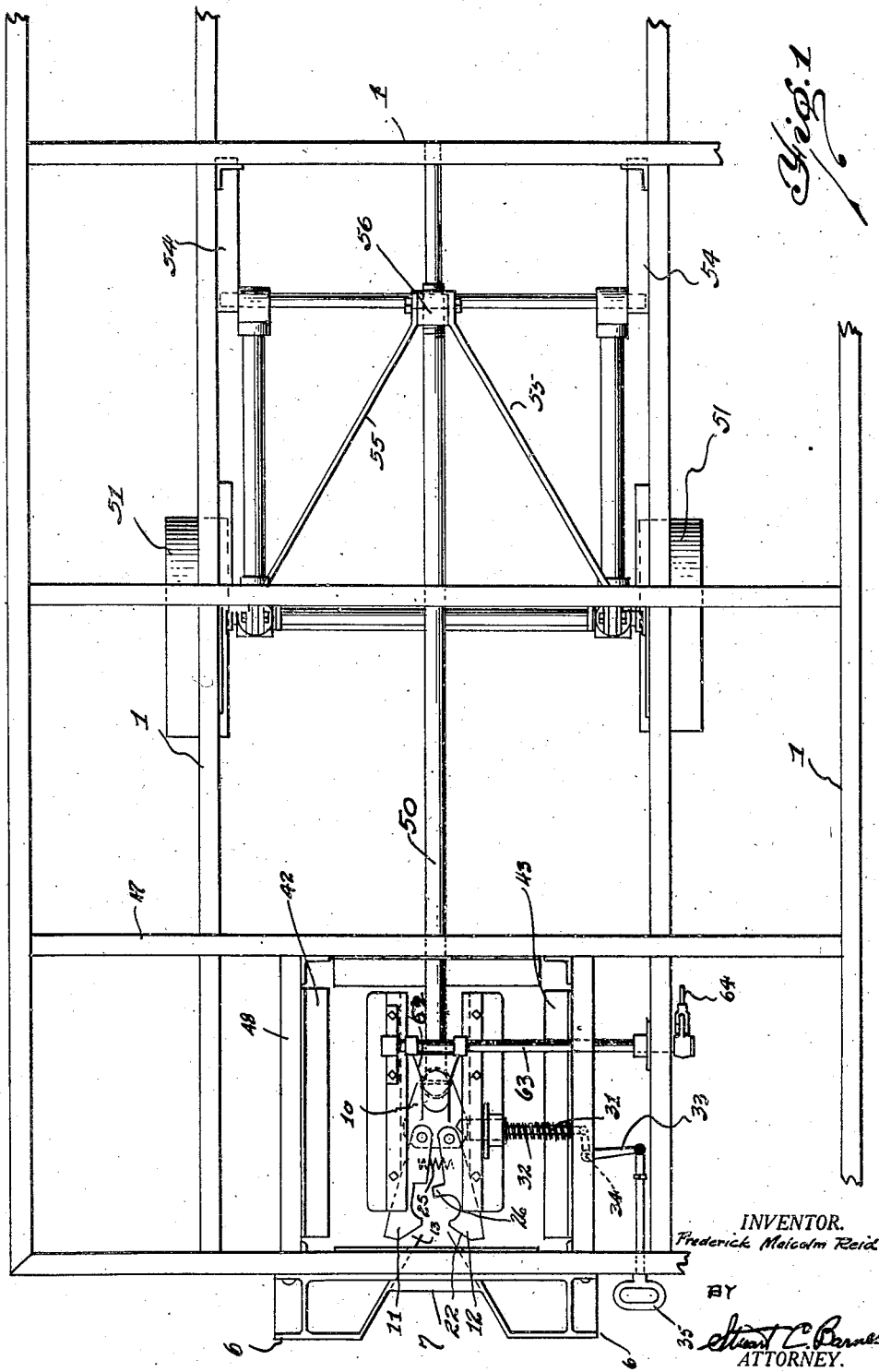
Figure 2:
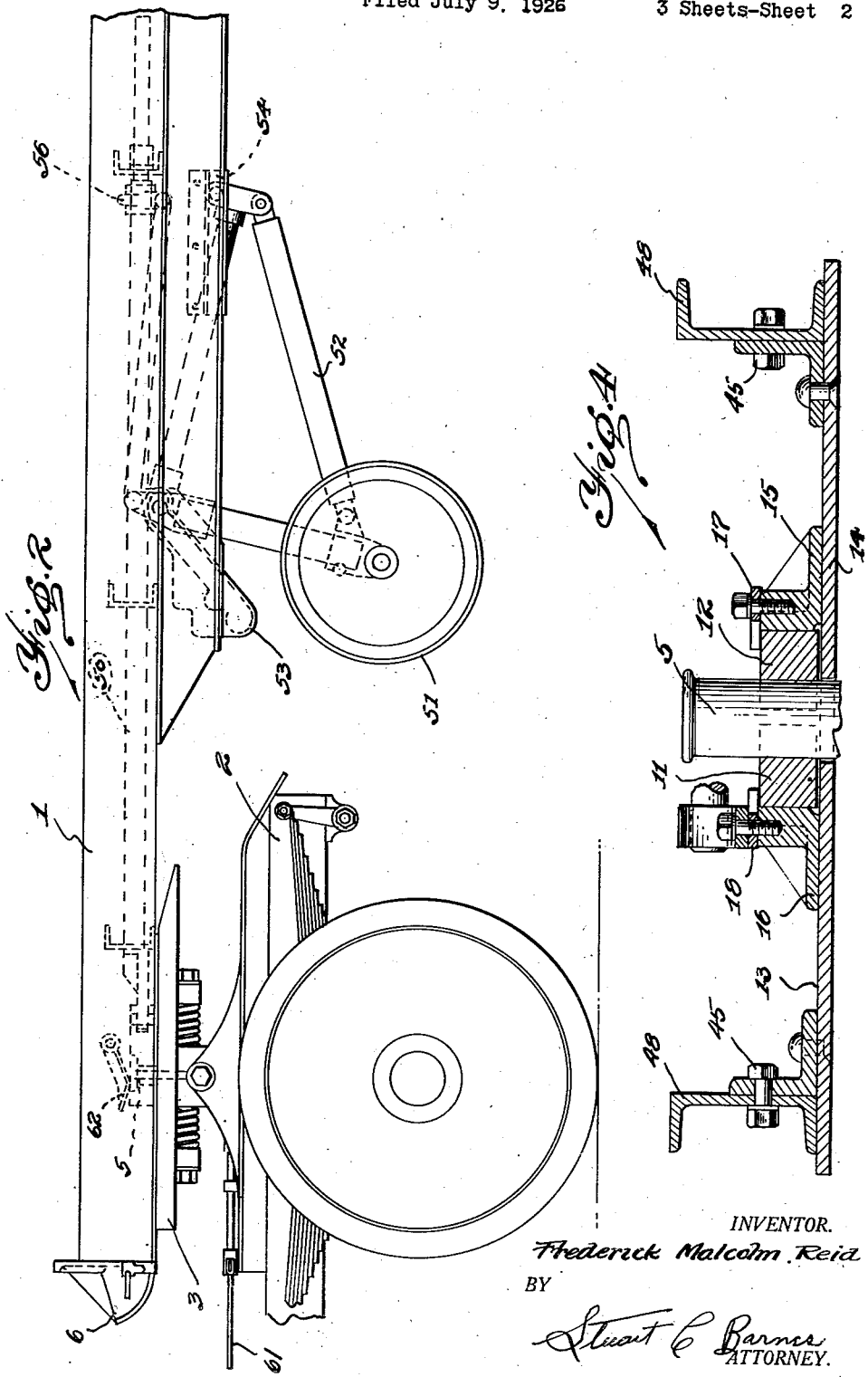
Figure 3:
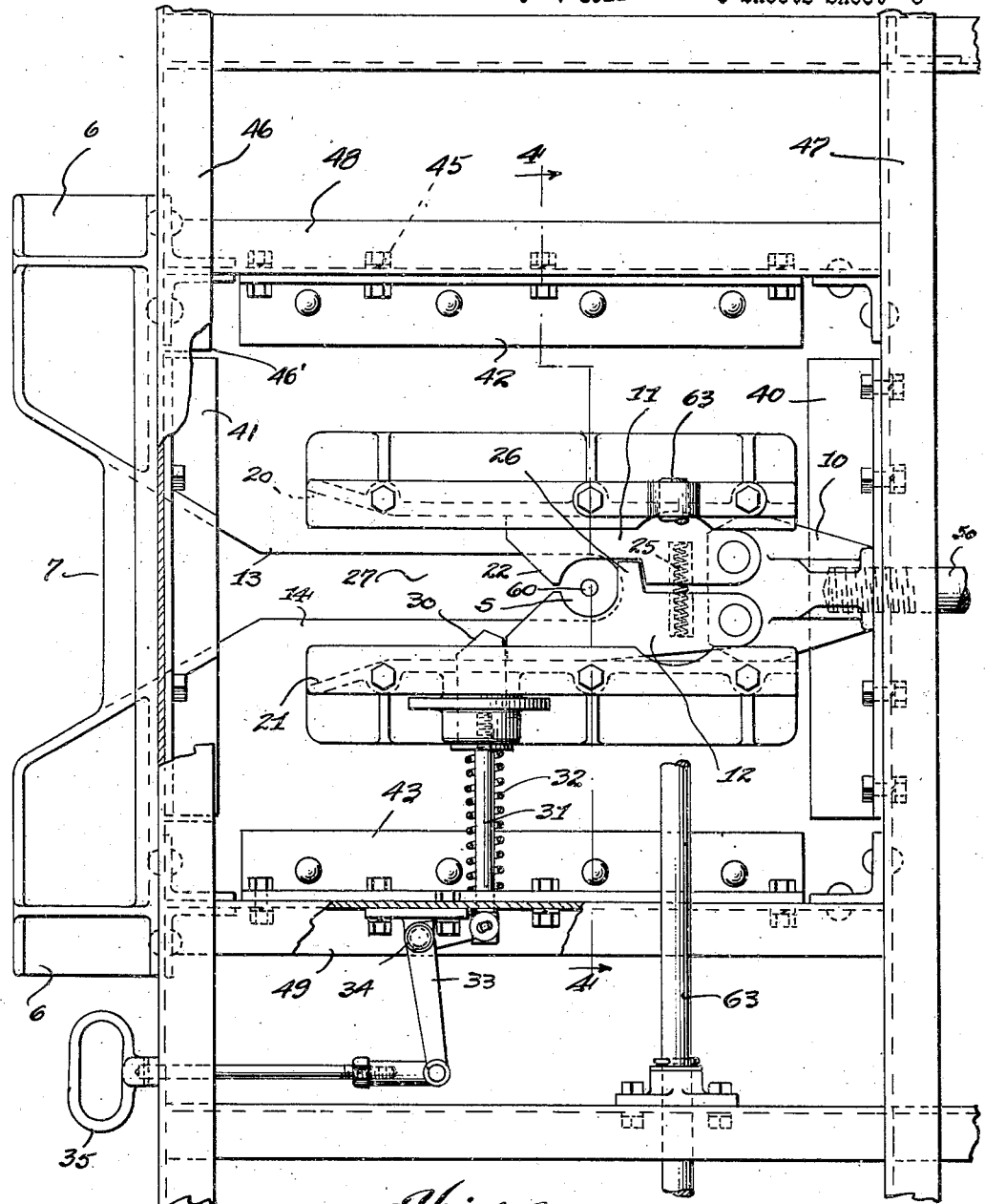

In the accompanying drawings, Fig. 1 is a plan view of part of the trailer frame showing the lock and the supporting structure; Fig. 2 is a side elevation showing the semi-trailer secured to a tractor; Fig. 3 is an enlarged detail of the locking mechanism; and Fig. 4 is a section taken on line 4—4 of Fig. 3.

Referring to the drawings and particularly to Figs. 1 and 2, the trailer includes a frame or platform 1, the rear end of which is supported by wheels (not shown). The forward end of the trailer frame is supported by a tractor 2 through a fifth wheel construction 3. The fifth wheel of the tractor carries a king-pin 5 which is adapted to be engaged by the locking device carried by the semi-trailer frame. The front end of the frame is provided with bumper-like members 6 providing an open passageway 7. These bumper-like members ride over the lower fifth wheel construction of the tractor when it backs into the semi-trailer, and the king-pin enters the passageway 7.

The locking device includes a reciprocating head 10 which carries, pivotally, a pair of lock members 11 and 12. This reciprocating head and the two lock members reciprocate in undercut slideways. This is provided by plates 13 and 14 upon which are bolted or riveted brackets 15 and 16. Secured to the top of the brackets are plates 17 and 18, thus forming a pair of undercut slideways (see Fig. 4). As indicated in Fig. 3, each slideway turns outwardly as at 20 and 21.

The two members of the lock are provided with bill-like members 22 which engage around the king-pin 5. The forward portions of the bill-like members are shaped so as to form slanting side walls in order to insure that the king-pin will enter between the two locking members in a proper manner. The two members are normally pressed outwardly by means of a coil spring 25.

As indicated in Fig. 1, the lock is in open position. In this position the reciprocating head is forward, and the two locking members project beyond the end of the slideways. The coil spring causes the two members of the clam lock to open up, in a position to receive the king-pin. When a tractor backs into the trailer the king-pin enters the passageway 7 and strikes a projection 26 of one of the locking members. Further backward movement of the tractor pushes the clam lock back and the king-pin passes through the channel 27 which lies between the two plates 13 and 14. The two locking members are swung upon their pivots and engage the king-pin, as indicated in Fig. 3.

In order to hold the clam lock in this locking position a latch 30 is provided. This latch is carried on the end of a rod 31 and is normally pressed into locked position by means of a coil spring 32. In order that an operator may release the latch, the end of the rod 32 is connected to a bell crank 33, pivoted as at 34, which is connected to, and is operable by means of, a handle 35. This general description of the latch is belived to be sufficient in so far as it relates to the locking device. This latch includes other mechanism by which certain operations are automatic, but this forms the subject matter of a separate application wherein such construction is fully described.

The entire locking mechanism is made up as a unit which can be easily inserted in place and bolted to the frame pieces of the trailer. The two plates 13 and 14 are assembled together by means of angle irons 40 and 41. Each plate has at its edge an angle iron as shown at 42 and 43. The clam lock, and the slides, are mounted on the plates and thus the locking structure is formed as a unit. The operation of mounting the locking structure on the trailer frame is thus simplified. It is only necessary to put the unit into place, and the four angle irons are then bolted to the members of the frame as shown at 45. The locking unit is bolted to the forward cross member of the frame 46, the cross member 47 and to longitudinally extending members 48 and 49. The channel of the member 46 faces inwardly, and it is cut away as at 46' to permit the lock to be put in place. After the lock has been put into place, the latch 30 may be easily connected to the lock through holes provided for that purpose. The connection may be made by screw threads. Also, a rod 50 is connected to the reciprocating lock member, after the lock is inserted in place. This also may be done by merely screwing the rod into a socket provided in the head for that purpose. It will thus be seen that the assemblying operation is simplified as the lock construction is mounted in the trailer frame as a unit, and that only two separate connections need be made.

As indicated in Figs. 1 and 2, the rod 50 extends toward the rear end of the trailer. This rod reciprocates with the reciprocating clam lock, and operates to raise and lower the supporting wheels 51. These supporting wheels are carried by frame 52, the ends of the frame being slidable in the inclined slideway 53, and the longitudinal slideway 54. The frame is connected by rods 55 to the rod 50, as shown at 56. It will be understood that when the lock is engaged with the king-pin of the tractor the supporting wheels and frame are in raised position as shown in Fig. 2, and that when the tractor is disengaged from the truck, the support moves down and the wheels 51 engage with the ground for supporting the forward end of the trailer.

The trailer may also include mechanism for operating brakes on its wheels, and this mechanism may operate through a fifth wheel construction. For this purpose the king-pin has a plunger 60 extending therethrough and which is operable by means of the rod 61 which leads to the driver's seat. The plunger moves up and down and actuates a member 62 which is secured to a rock shaft 63 and which is in turn connected to the wheels of the semi-trailer by means of a rod 64.

It will be observed that a lock constructed in accordance with this invention, is made up as a unit and easily and quickly mounted in the trailer frame, and that only two connections need be made after the unitary lock construction is so mounted. The arrangement of the clam lock provides for positive locking and unlocking operation. As the tractor backs into the trailer the clam lock is pushed rearwardly. This movement causes the two members of the clam lock to move toward each other, thus engaging the king-pin. At the end of the rearward movement the latch springs into place and the connection is completed. During the rearward movement of the clam lock the supporting frame of the semi-trailer is lifted from the ground. In the releasing operation the driver retracts the latch 30 by means of the handle 35. The tractor is now moved forward and the clam lock is pulled forward. This action pulls the rod 50 forward and lowers the supporting frame with a positive action. When the claim lock reaches the end of the undercut slideways the two members separate and the tractor becomes disconnected.

I claim:

1. In a combined vehicle of the character described comprising a tractor and a trailer, a coupling mechanism comprising, in combination, a vertical king pin on the tractor, a pair of horizontally swingable jaws mounted on the trailer and providing a forwardly opening coupling socket for receiving said king pin, means for causing said jaws to be closed about said king pin including a head operatively connected to the jaws and adapted to be reciprocated back and forth on the trailer as the tractor moves toward and away from the trailer during coupling and uncoupling and in such actuation to close and open said jaws, and a member operable to lock said head in its rearward or coupled position so that the tractive force of the tractor may be applied to the trailer through the medium of said jaws and said head.

2. In a semitrailer and tractor combination with a king-pin on the tractor, an upper fifth wheel member having a longitudinal forwardly diverging slot for the king-pin of the tractor, a pair of guide members supported above and one on each side of said slot, and one or more king-pin-engaging jaws supported in and guided and held closed by said guides when the jaw or jaws are pushed rearwardly, and means for holding the jaws in their rearmost position locked about the king-pin.

3. In a semitrailer and tractor combination with a king-pin on the tractor, an upper fifth wheel member having a longitudinal forwardly diverging slot for the king-pin of the tractor, a pair of guide members supported above and one on each side of said slot, and one or more king-pin-engaging jaws supported in and guided and held closed by said guides when the jaw or jaws are pushed rearwardly, means for holding the jaws in their rearmost position locked about the king-pin, and a service bar for performing one or more service operations on the trailer movable with said jaws by the actuation of the king-pin.

4. In a semitrailer and tractor combination with a king-pin on the tractor, an upper fifth wheel member having a longitudinal forwardly diverging slot for the king-pin of the tractor, a pair of guide members supported above and one on each side of said slot, and one or more king-pin-engaging jaws supported in and guided and held closed by said guides when the jaw or jaws are pushed rearwardly, and a latch in one of the guide members arranged to automatically engage and hold one of the members moving between said guide members.

5. In a trailer-tractor combination of the automatic semitrailer type, the combination of a tractor provided with an upstanding king-pin, a trailer having a slotted plate on the under side fixed in a stationary relation therewith, guides supported by said plate, one or more jaws guided between said guides when the king-pin enters said slot in the plate and serving to engage the king-pin when the jaws pass toward the rear of said guides, and a latch in one of the guide members arranged to automatically engage and hold one of the members moving between said guide members.

6. In a semitrailer-tractor combination, a tractor provided with a king-pin, a trailer having a pair of fixed longitudinally extending guides having at the front one or more diverging cam surfaces, one or more cam jaws arranged to slide between the guides and be cammed into engagement with the king-pin when the king-pin strikes the same and pushes them back, the camming action being effected by their engagement with the guide members, and a latch in one of the guide members arranged to automatically engage and hold one of the members moving between said guide members.

7. In a trailer-tractor combination of the semitrailer type, a slotted upper fifth wheel member arranged to receive and guide a king-pin, a pair of angle arm guides along said slot and secured to the plate, and one or more jaws slidable along said guides to engage and hold the king-pin, a releasable latch passing through one of the guides and arranged to engage behind one of the jaws.

8. In a trailer-tractor combination of the semitrailer type, a slotted upper fifth wheel member arranged to receive and guide a king-pin, a pair of angle arm guides along said slot and secured to the plate, and one or more jaws slidable along said guides to engage and hold the king pin, a releasable latch passing through one of the guides and arranged to engage behind one of the jaws, and a service bar for performing one or more service operations on the trailer movable with said jaws by the actuation of the king-pin.

In testimony whereof I affix my signature.

FREDERICK MALCOLM REID.